United States Patent [19]

Prinz et al.

[11] 4,235,535
[45] Nov. 25, 1980

[54] APPARATUS FOR PROJECTION ON A CYLINDRICAL SCREEN

[75] Inventors: Benjamin Prinz, Bremen; Wolfgang Schmidt, Dortmund-Hombruch, both of Fed. Rep. of Germany

[73] Assignee: Vereinigte Flugtechnische Werke-Fokker GmbH, Bremen, Fed. Rep. of Germany

[21] Appl. No.: 969,242

[22] Filed: Dec. 13, 1978

[30] Foreign Application Priority Data

Dec. 14, 1977 [DE] Fed. Rep. of Germany ....... 2755693

[51] Int. Cl.³ .......................... G09B 9/06; G03B 21/28
[52] U.S. Cl. ....................................... 353/11; 353/98; 353/50; 353/81; 35/12 N
[58] Field of Search ................... 35/11, 12, 98, 37, 50, 35/81, 99, 101, 10.22, 11 A, 12 N

[56] References Cited

U.S. PATENT DOCUMENTS

| 1,682,163 | 8/1928 | Alder | 353/101 |
| 1,738,942 | 12/1929 | Brenkert et al. | 353/99 |
| 2,548,554 | 4/1951 | Nivison et al. | 353/81 |
| 2,966,096 | 12/1960 | D'Incerti et al. | 353/81 |
| 3,845,571 | 11/1974 | Hervieu | 353/12 |
| 3,951,527 | 4/1976 | Blanz | 353/98 |

FOREIGN PATENT DOCUMENTS 2554972 6/1977 Fed. Rep. of Germany .

*Primary Examiner*—John W. Shepperd
*Attorney, Agent, or Firm*—Smyth, Pavitt, Siegemund, Jones & Martella

[57] ABSTRACT

The projector includes a housing with a projection path duct holding a dove prism and a mirror deflecting the path into a vertical axis. The beam in that path is intercepted by a tiltable mirror held in a rotatable disk. A transmission which includes bevel gearing, shafts and worm gears couples the tiltable mirror to a computer controlled motor for adjusting the elevation of the projection. Other transmission devices, including gears and worm gear, couple the disk to another motor to causing the projection beam to project in different horizontal directions. The projector is used to superimpose particular images upon a background image in a ship simulator.

7 Claims, 4 Drawing Figures

APPARATUS FOR PROJECTION ON A CYLINDRICAL SCREEN

BACKGROUND OF THE INVENTION

The present invention relates to a projection apparatus for projecting images on a cylindrical screen for purposes of simulating the view from a ship and being included in a ship simulator.

British Pat. No. 1,406,365, German printed patent application No. 2,554,972, and U.S. Pat. No. 3,862,358 describe projection systems for and in a ship's simulator. The equipment is usually constructed so that the field of view as actually displayed or projected is controlled by a computer. A trainee controls and steers the "ship" and thereby modifies that field of view in a feedback type operation in which the trainee is an active participant.

The image being displayed is usually a composite one and includes, e.g. open see, harbor views, channel shores or general shore lines. Superimposed upon such a background are images of buoyances, light houses, light ships or even of ships moving in relation to the simulator ship. German printed patent application No. 2,319,545 discloses a ship simulator which includes a separate projector for such a supplemental display. The projector is a slide projector disposed on a rotatable turret for selective display of individual slides. The turret simulates a horizontal movement of the object being displayed, but that type of visual simulator lacks realism and is limited to horizontal movement. U.S. Pat. No. 3,862,358 discloses a synthetizer in which the scenery being displayed results from superimposing different live views as observed by cameras, the views being models. Again, this kind of simulation lacks realisms to a considerable extent.

DESCRIPTION OF THE INVENTION

It is an object of the present invention to provide a new and improved projection equipment for the projection of the images of specific objects upon the cylindrical display screen of and in a ship's simulator.

In accordance with the preferred embodiment of the present invention, it is suggested to provide a projector beam in a vertical axis and to intercept the beam by a mirror which is tiltable on a horizontal axis which, together with the mirror, can be rotated on the vertical axis. The rotational movement and the tilt movement are transmitted separately upon the mirror and are initiated by separate, computer controlled drive means. Optical means are provided to rotate the projector beam commensurate with the rotation of the mirror to obtain consistently an upright image.

Preferably, the mirror is hung in a horizontal disk which is rotatable on a vertical axis, and is traversed by a shaft being bevel-geared to the mirror which is journalled for tilting in, from and below the disk. The disk is driven by a motor, and a second motor drives the shaft carrying the bevel gear. That second motor is either mounted directly on the disk or somewhat displaced therefrom, and additional transmission means are provided to drivingly connect the second motor to that shaft. It is desirable in either case to provide means for decoupling the two drives so that tilting and rotating the mirror can be carried out completely independently. This projector permits the projection of superimposed images upon a background image as projected otherwise on a cylindrical screen.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
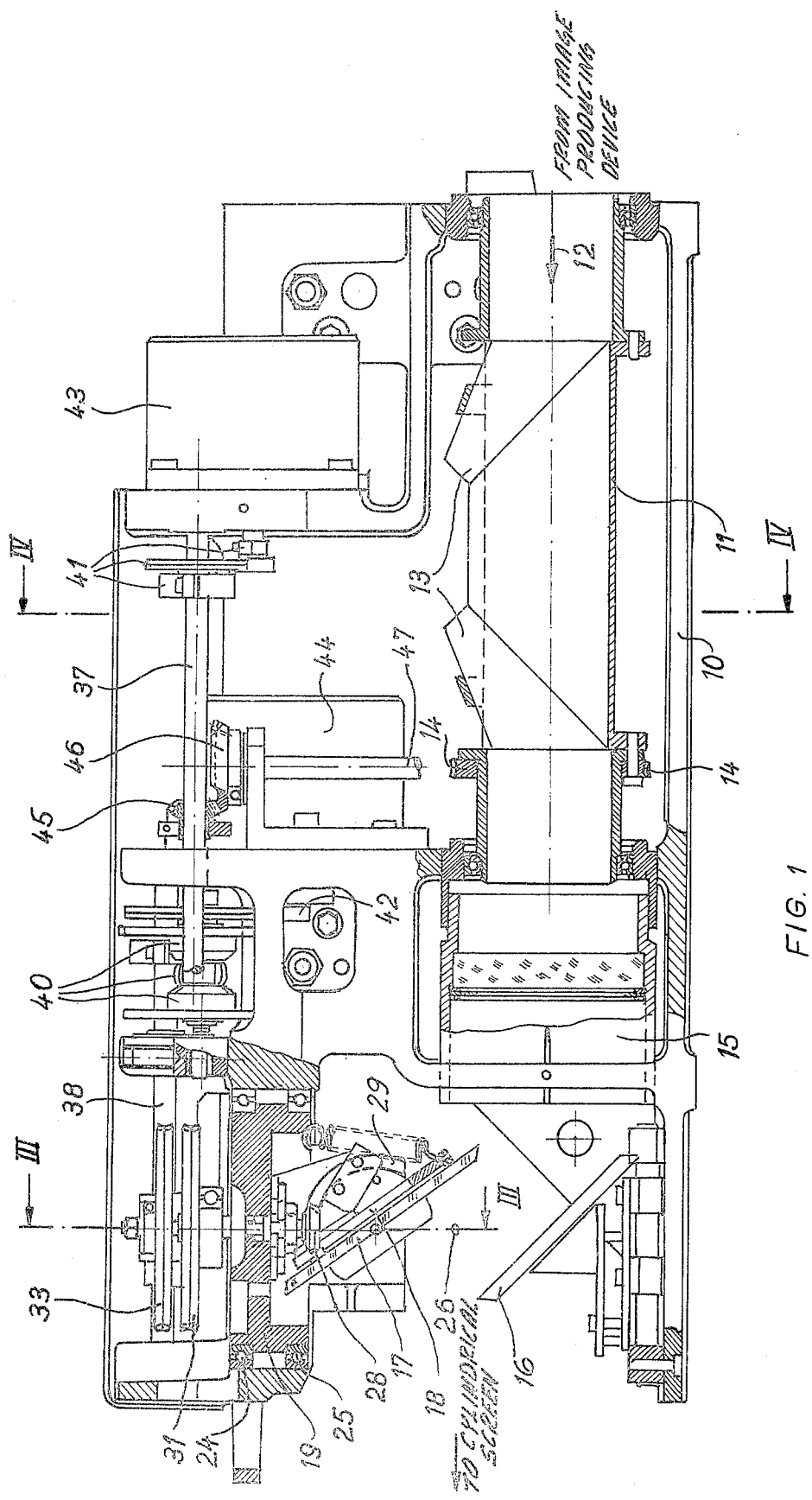
FIG. 1 is a front view of a projection apparatus in accordance with the preferred embodiment of the invention.
Figure 2:
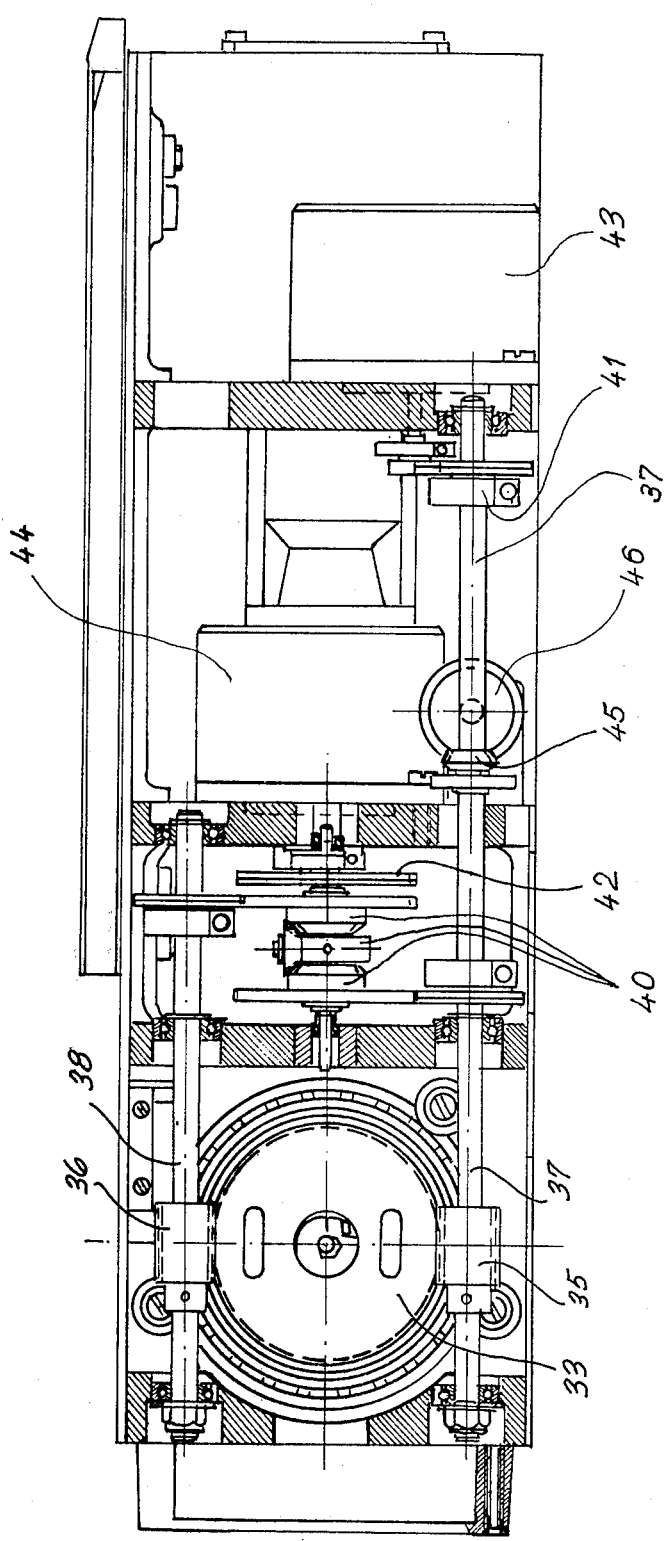
FIG. 2 is a top elevation of the projector shown in FIG. 1.

Proceeding now to the detailed description of the drawings, the figures illustrate a projection apparatus in a ship's simulator. Not shown is a cylindrical projection screen which extends, e.g. around an axis at a sufficient distance from the illustrated equipment. Also not shown is the projection device for projecting an overall background image upon that screen. Any of the known devices can be used here. The particular apparatus illustrated projects and superimposes additional visual information upon such a background image.

The illustrated projector includes a case or housing 10 with an input duct 11 for light 12. It is presumed that a slide or other type of picture is imaged and projected in a suitable manner in and by means of a light beam 12.

Duct 11 includes a prism 13 being or functionally resembling a dove prism. Generally speaking, prism 13 represents an optical device by means of which the image information contained in beam 12 can be rotated about the beam's axis. In order to obtain the rotation, duct 11 can be turned on the optical axis of the prism by means of a gear 14. The duct is mounted in bearings in the case 10 accordingly. Driving the duct for rotation will be described below.

Next in line on the optical axis is a projection lens or lens system or objective 15. The optical system 15 may complement the image producing projection system for this supplemental optical information; 15 is, therefore, the objective lens of the projector. The beam is directed towards a mirror 16. This mirror is stationary in housing 10 and is inclined by 45° to the axis of tube 11. Thus, mirror 16 reflects the beam 12 in upward direction along an axis 26 which ideally coincides with the axis of the cylindrical projection screen or is at least quite close to it.

Figure 3:
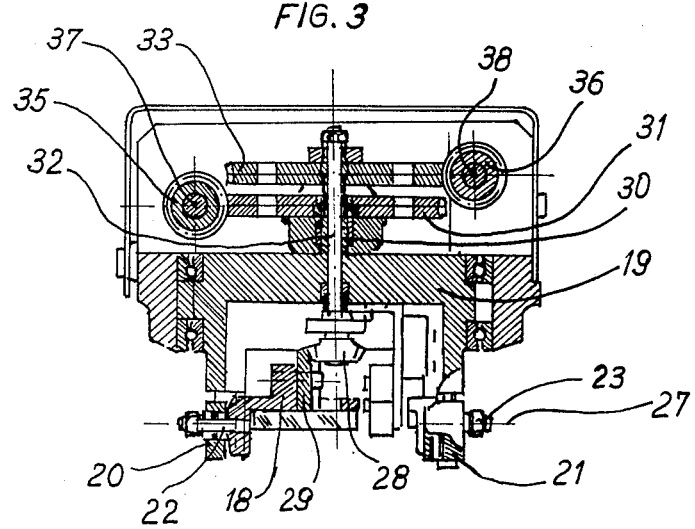
FIGS. 3 and 4 are respectively views taken in planes III—III and IV—IV as indicated in FIG. 1.
Figure 4:
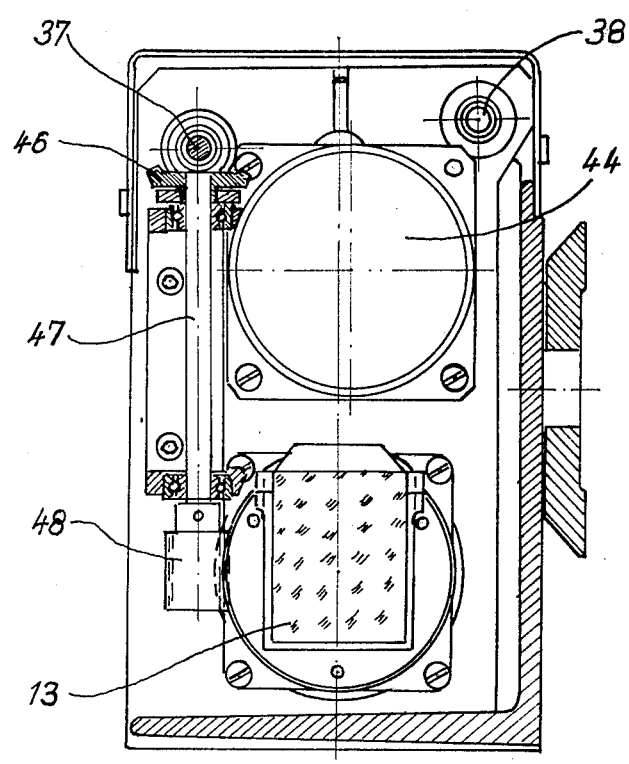

The projection beam is intercepted by a mirror 17 which is mounted on a plate 18. That plate can be pivoted or tilted directly about a horizontal axis in the plane of mirror 17 as well as indirectly about vertical axis 26. Particularly, plate 18 is mounted in a disk 19 by means of pins or axes 22, 23 being respectively journalled in bearings 20 and 21 which, in turn, are disposed in bearing mounts extending down from disk 19 (see FIG. 3). The pins 22, 23 have a common axis 27 in the plane of mirror 17 for up and down tilting of the mirror.

Disk 19 is journalled in a horizontal plane in housing 10 by means of ball bearings 24; disk 19 turns on and rotates about axis 26 accordingly. As mirror 17 intercepts and deflects beam 12, turning of the disk 19 about axis 26 changes the horizontal direction of projection. The disk 19, thus, is a tilt mount for the mirror 17 on its holder 18. Upon tilting mirror 17 about pins 22, 23, the projected image is displaced up or down. The image displacement and movement is controlled as follows.

A hollow shaft 30 extends upwardly from the disk 19 and carries a pair of gears 31, being clamped to the shaft. A spindle 32 is mounted in ball bearings and traverses hollow shaft 30. Spindle 32 carries likewise a clamped on pair of gears 33. The two gear pairs, 31 and 33, respectively, engage worm wheels or gears 35, 36 which, in turn, sit respectively on drive shafts 37, 38.

Shafts 37 and 38 are mounted and journalled in case 10 by means of suitable ball bearings and the shafts are intercoupled by means of a differential gear 40. Additionally couplings 41 and 42 connect the shafts 37 and 38, respectively, to stepping motors 43 and 44. These motors are mounted in case 10 generally above tube 11 and the optical equipment immediately related thereto.

The spindle 32 as projecting through disk 19 carries at its lower end a bevel gear 28 which, in turn, meshes a bevel gear segment 29. The latter segment is mounted to the back of mounting plate 18. As can be seen from FIG. 1, this segment has a center or center axis which coincides with the axes 27. Accordingly, step motor 44 drives shaft 38 which is coupled to gear segment 29 via transmission means which includes gear 36, gears 33, shaft 32 and bevel gear 28, to thereby pivot mirror 17 on holder 18 up or down depending upon the direction of movement of the motor driven shaft 38.

As far as horizontal deflection is concerned, step motor 43 drives shaft 37 which is coupled to disk 19 via transmission means which include gear 35, gears 31, and hollow shaft 30. Upon turning of disk 19, the optical axis of projection towards the cylindrical screen is deflected into different horizontal directions.

Shaft 37 carries a bevel gear 45 meshing a gear 46 whose shaft 47 drives a worm gear or wheel 48. Shaft 47 is mounted vertically in case 10 by means of ball bearings. The gear 48 meshes the spur gear 14 on tube 11. The gear ratios involved, as far as deriving motion from shaft 37 is concerned, are selected so that the speed of rotation (or the angular increments of motion) of prism 40 13 is half the respective value for disk 19. The rotation of prism 13 is needed to make sure that the image as projected in different directions is always upright.

The apparatus by cooperation of projection objective 15 and of the optics that forms beam 12, provides for a projection of particular image increments which are superimposed upon any image projected otherwise onto the large cylindrical screen that envelopes, so to speak, the projection. Assuming the device is used in a ship's simulator, one may well provide more than one such superimposing projections, e.g. on rotatable platforms near the "bridge" of the simulator. One or more such projectors may now simulate sea traffic in a rather realistic manner.

Of course, one cannot cover with a single projector a full 360°, unless the projector itself is mounted on a turntable. However, even such a stationary projector can easily cover ±120° (or 240°). Moreover, as far as the simulator is concerned, the rearward view from the bridge of a ship is usually obscured anyway, e.g. by smoke stacks or their modern equivalent.

As far as vertical deflection (elevation) and pivoting of mirror mount 18 is concerned, a range from about +20° to about −30° is readily available. This range suffices because a higher projection is unnecessary for purposes of training the steering of a ship, a higher projection just leads towards the sky. A steeper down direction is not needed either because such direction will point to deck portions of the ship which are and remain just background. The vertical height of the projector screen is limited here for that reason anyway.

The step motors 43 and 44 will be controlled as output equipment of and by a computer, so that the movement of the projected image simulates accurately relative motion of objects across the field of view. The differential gear 40 couples the two shafts 37 and 38 at a transmission ratio of −1 and suppresses the transmission of rotary motion of disk 19 upon the spindle 32 and vice versa by direct frictional coupling.

In lieu of differential gear 40 one may mount the step motor 43, driving the shaft or spindle 32, directly on disk 19.

It can, thus, be seen that the invention permits a completely separate and individual of positioning of superimposed images in relation to a cylindrical projection screen of a ship's simulator.

The invention is not limited to the embodiments described above but all changes and modifications thereof not constituting departures from the spirit and scope of the invention are intended to be included.

We claim:

1. A projector for use in a computer-controlled ship-simulating system, which system includes a cylindrical projection screen for the display of images representing localized visual environment of a ship, the projector comprising:

optical projections means directing a projection beam into a vertical axis and including image-rotating means;

a mirror;

means for mounting the mirror on the axis for the turning-movement about said axis, and for providing a tilt-movement upon the mirror about a horizontal axis which turns upon said turning-movement but intersects in any position the vertical axis, respectively, for directing said projection beam in various directions towards said screen, corresponding to the turning movement, and at different elevations of display, corresponding to the tilt movement;

a pair of motors; a pair of transmission means, including coaxial means for coupling the motors of the pair to said means for mounting in order to obtain, respectively, said turning movement and said tilt movement as independent adjustment movement, the motors being controlled by said computer; said image-rotating means being drivingly connected to the motor of the pair providing the turning movement, to cause the image-rotating means to maintain a particular orientation of the projection beam as reflected by the mirror; and differential gear means, cross-coupling the transmission means of the pair in order to obtain rotational decoupling and independant turning and tilt movements.

2. A projector as in claim 1, said optical projection means including a horizontal projection path;

a second mirror in the path, directing the beam into the vertical axis, said optical image-rotating means being disposed optically in said horizontal path 3. A projector as in claim 1 or 2, said image-rotating means being an image-rotating dove prism, the prism turning at half the angular rate of said turning movement.

4. A projector for use in simulator which includes a cylindrical projection screen onto which local images are to be projected at various locations, comprising:

- optical means for projecting an imaging beam into a vertical axis;
- a mirror disposed to intercept the beam as projected at an angle;
- means for positioning and mounting the mirror and including (i) a disk mounted for rotation on said vertical axis; (ii) a tilt mount means on the disk, defining a horizontal axis and intersecting the vertical axis; (iii) and holder means mounted to the tilt mount means for tilting and mounting said mirror;
- first controllable drive means first transmission means for connecting said drive means to said disk and including a hollow shaft coaxial to said vertical axis and being connected for rotating said disk;
- second transmission means coupled to the holder means for tilting the holder means over a limited angular range and including a shaft traversing the hollow shaft in coaxial relation therewith;
- second controllable drive means drivingly connected to the shaft of the second transmission means to obtain the tilting of the holder means;
- differential gear means, interconnecting the first and second transmission means to decouple the holder from the disk; and
- image rotating means connected to the first drive means and optically included in an optical path of the optical means in order to maintain a particular image orientation of an image as reflected by the mirror.

5. A projector as in claim 4, said transmission means including a shaft traversing and clearing the disk;
- a bevel gear on the shaft and a bevel segment mounted to the holder means and meshing the bevel gear.

6. A projector as in claim 4, including coaxial drive means having a first hollow shaft secured to the disk for driving same, a second shaft traversing the hollow shaft and being included in the transmission means, and gear means also included in the transmission means for drivingly coupling the holder means to the second shaft, the first and second controllable drive means being respective connected to the first and second shaft.

7. A projector as in claim 4, the first and second drive means respectively including two motors and a pair of shafts including worm gear means, said first and second shafts being provided respectively with two gears meshing the worm gear means for being driven by the motors.

* * * * *